(12) United States Patent
Larson

(10) Patent No.: US 7,458,417 B2
(45) Date of Patent: Dec. 2, 2008

(54) VEHICLE ENERGY MANAGEMENT SYSTEM

(75) Inventor: Gerald L. Larson, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 348 days.

(21) Appl. No.: 11/359,708

(22) Filed: Feb. 22, 2006

(65) Prior Publication Data

US 2006/0137923 A1    Jun. 29, 2006

Related U.S. Application Data

(62) Division of application No. 10/427,811, filed on May 1, 2003, now Pat. No. 7,231,959.

(60) Provisional application No. 60/377,158, filed on May 2, 2002.

(51) Int. Cl.
*B60H 1/00* (2006.01)

(52) U.S. Cl. ............... 165/202; 165/287; 123/41.01

(58) Field of Classification Search .............. 165/202, 165/287, 41, 42, 43, 44; 123/41.01, 41.02, 123/41.11, 41.12, 41.48, 41.49; 62/183, 62/184, 236
See application file for complete search history.

(56) References Cited

U.S. PATENT DOCUMENTS

| | | | | |
|---|---|---|---|---|
| 4,085,594 A | * | 4/1978 | Mayer | 62/183 |
| 4,716,740 A | * | 1/1988 | Hayes | 62/184 |
| 4,756,473 A | * | 7/1988 | Takemae et al. | 236/49.3 |
| 4,947,657 A | * | 8/1990 | Kalmbach | 62/236 |
| 7,290,592 B2 | * | 11/2007 | Larson | 165/41 |

* cited by examiner

*Primary Examiner*—Ljiljana (Lil) V Ciric
(74) *Attorney, Agent, or Firm*—Jeffrey P. Calfa; Gerald W. Askew

(57) ABSTRACT

A vehicle energy management system including a vehicle engine crankshaft mounted generator as well as single function heat exchangers, with each of the single function heat exchangers associated with a corresponding electric fan. The electric fans are controlled to sequentially energize to avoid overloading the generator.

2 Claims, 7 Drawing Sheets

VEHICLE ENERGY MANAGEMENT SYSTEM

This is a division of application Ser. No. 10/427,811, filed May 1, 2003, now U.S. Pat. No. 7,231,959.

This is a non-provisional patent application claiming the priority of provisional patent application Ser. No. 60/377,158, filed May 2, 2002.

BACKGROUND OF THE INVENTION

Modern commercial vehicles include conventional electrical supply systems. These systems provide low voltage DC to vehicle manufacturer provided systems. Most commercial vehicles are produced by an original equipment manufacturer (OEM) and later are provided with customer equipment. The customer equipment could at one time have been powered from the OEM provided electrical system without any strain on the system. The customer application equipment varies widely, however examples would include refrigeration systems for produce delivery vehicles or trucks to fire pumps for fire trucks to towing winches on tow trucks.

As the end user applications have grown so have their power requirements. Alternator capacity for the latest in medium-duty diesel powered trucks is a 100-amp capacity. Heavy-duty trucks with home-like conveniences such as microwave cooking ovens have a demand in the 2400 watts range with a 164-amp alternator. For trucks with added customer application equipment, OEMs estimate total vehicle capacity will be 3000 watts with the next generation of engine controls expected to demand more. When the OEM electrical system capacity has been exceeded, customers have relied upon diesel powered auxiliary systems beyond the vehicles main engine or electro-hydraulic generators with hydraulic energy supplied by an engine mounted power take-off (PTO) from the vehicle's main engine. The issues for these solutions include cost, system control, and lack of efficiency. An additional auxiliary diesel engine adds cost as well as inconvenience. The control would be separate from the main vehicle engine. Electro-hydraulic generators are direct linked to the main engine through the PTO. This is inefficient in that energy is wasted on these units even when the customer energy consumption devices are not in use.

There is a need for an integrated vehicle energy management system that provides the energy for the increasing customer application needs without reducing the overall vehicle energy efficiency and is controlled by an integrated control system.

SUMMARY OF THE INVENTION

One general object is to provide an integrated energy management system for providing the capacity to power increased customer application needs without the need for an additional diesel engine. Additional objects include improving the overall vehicle energy efficiency as well as providing control to this added capacity that is integrated into an existing on-board vehicle control system.

The vehicle energy management system of this invention provides an attractive solution to the objects of the invention as well as to customer and vehicle issues not mentioned. The energy management system uses the main vehicle engine as the main provider of OEM provided and customer application equipment. Since the system does not mandate that conventional engine capacity be increased, the energy management system relies on the principle of reallocation of existing resources provided by the OEM for efficient redistribution. Specifically, the system involves the replacement of engine belt or engine direct driven components with electrical motors. The engine-direct drive fan draws as much as 30-40 HP to operate. Since replacement of the main fan unit would involve a prohibitively large fan due to starting currents, the larger component that would have multiple cooling purposes is replaced with smaller single function electrical components. The larger multipurpose heat exchangers such as the vehicle radiator are replaced with smaller single function heat exchangers associated with the smaller electric fans. An electric fan with the dedicated purpose of providing flow for engine coolant might draw 9-10 HP instead of the original 30-40 HP of the direct mechanical drive fan. These heat exchangers and fans may be mounted to the same vehicle component, an example being the chassis. This would allow for tighter tolerances between the fan and heat exchanger passages, thereby improving efficiency. The energy management system may involve a main vehicle engine crankshaft mounted generator. This simple generator creates high voltage direct current (DC) electricity. In one embodiment, this generator is mounted directly to the forward portion of the crankshaft and also provides the crankshaft dampening function. The high voltage DC may be converted to household level AC (115VAC) for the operation of customer application equipment. In one embodiment, the converter is a closed loop converter that makes the conversion of DC to AC alternatively turning on and off at a varying frequency in order to produce a time averaged AC output. The household or customer level AC is directed to the customer electrical bus that is provided at the OEM level. A portion of the household or customer level AC is converted to lower voltage DC through transformers or rectifiers. This low level DC is used to power cab instruments and controls and higher level of this low level DC may be used for next generation engine controls. The design's use of the ON-OFF closed loop or otherwise known as a switch mode converter in a vehicle is unique. Similarly, the energy management systems use of a larger number of smaller single function heat exchangers and associated electric fans provides unique advantages such as flexibility about the location of the heat exchangers in areas other than the front of the vehicle and enhanced efficiency due to tolerance reduction with the common mounting areas for fans and heat exchangers. It is anticipated that there will be an associated improvement in fuel economy, as the individual electric fans will not have to all run the same time. The prior art direct drive fans and motors were constantly wind milling during engine operation.

DETAILED DESCRIPTION

Figure 1:
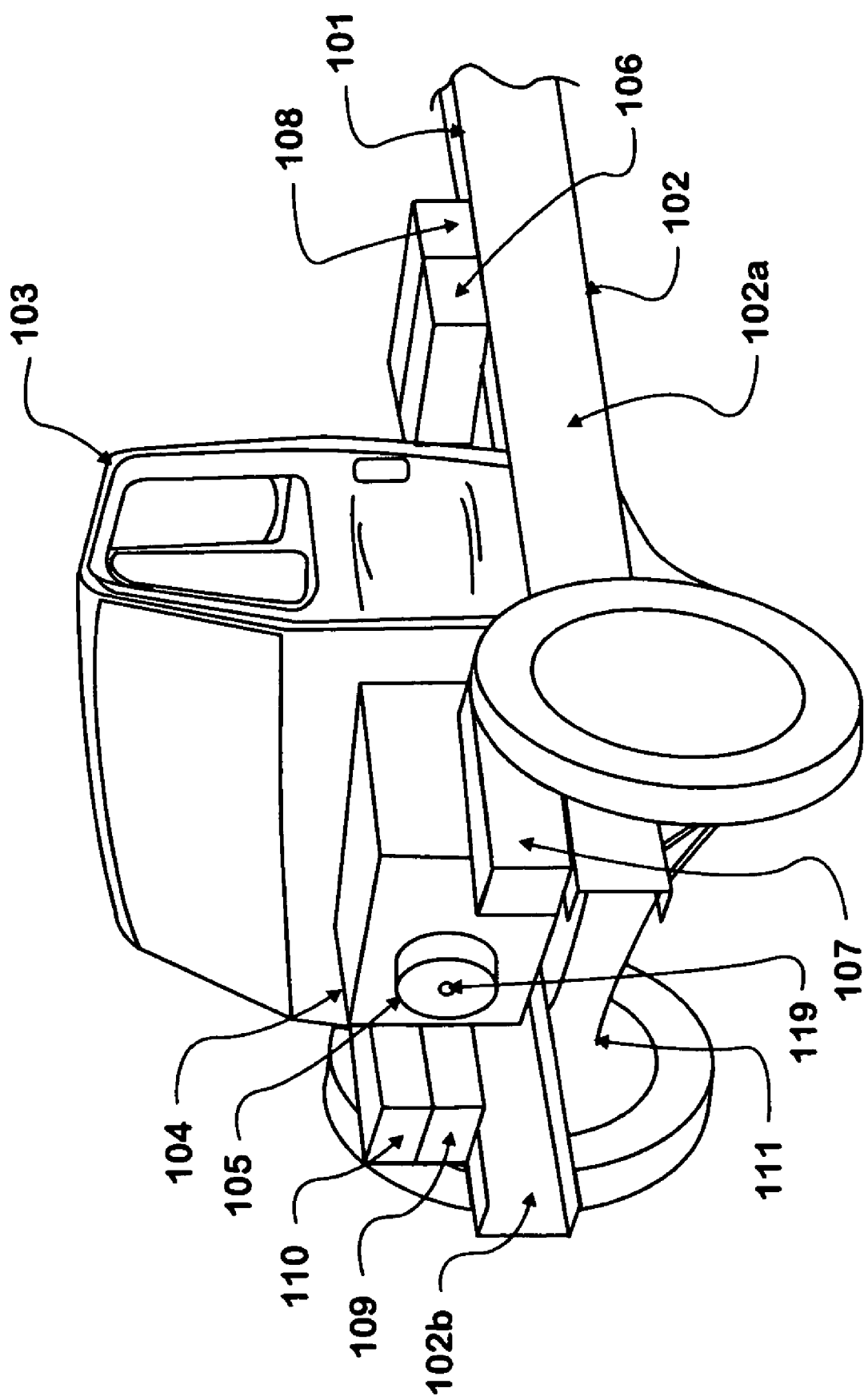
FIG. 1 is partial cutaway perspective view of a mobile vehicle with an embodiment of a vehicle energy management system installed and made in accordance with the invention.
Figure 2:
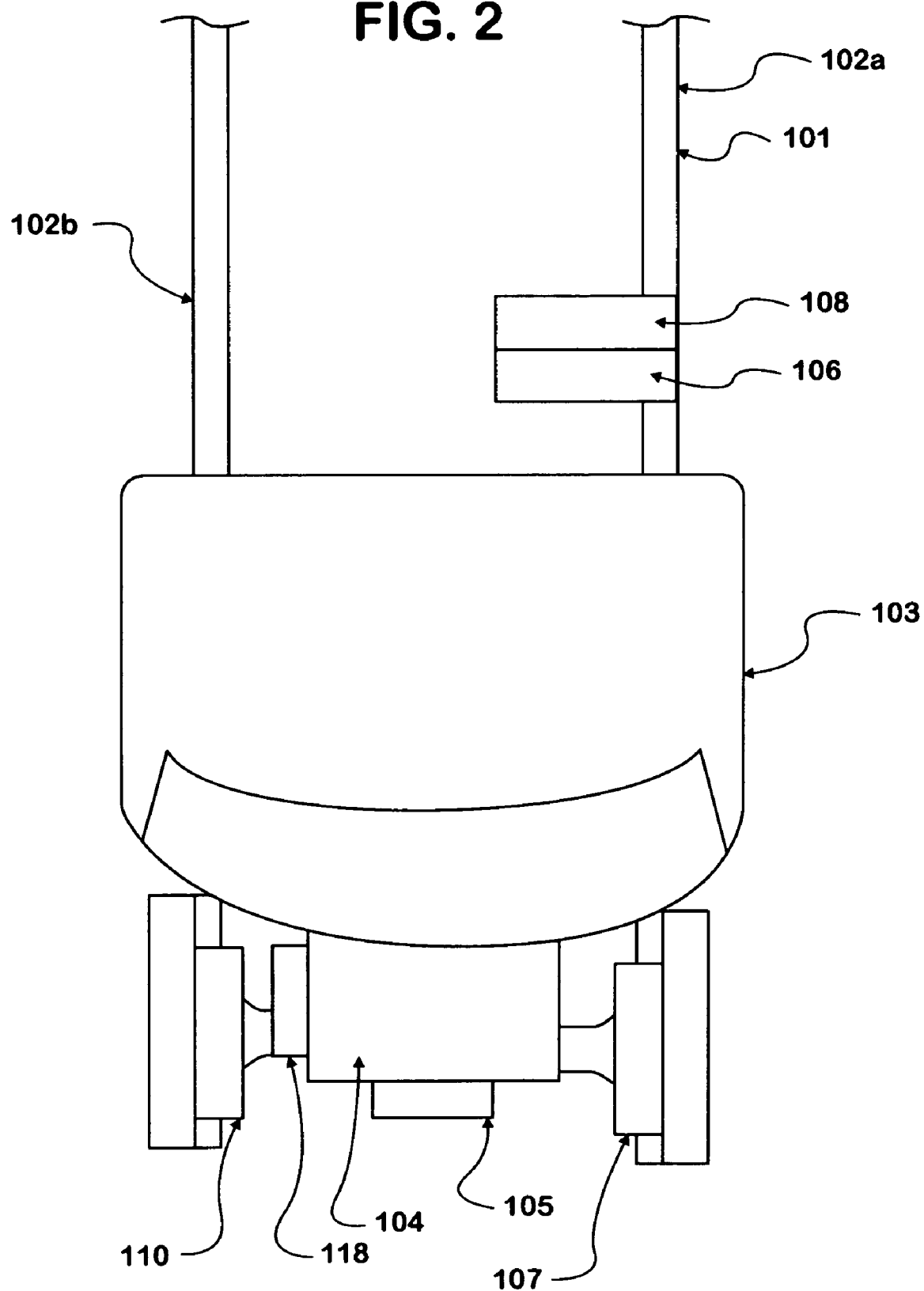
FIG. 2 is a top down view of the vehicle of FIG. 1.
Figure 3:
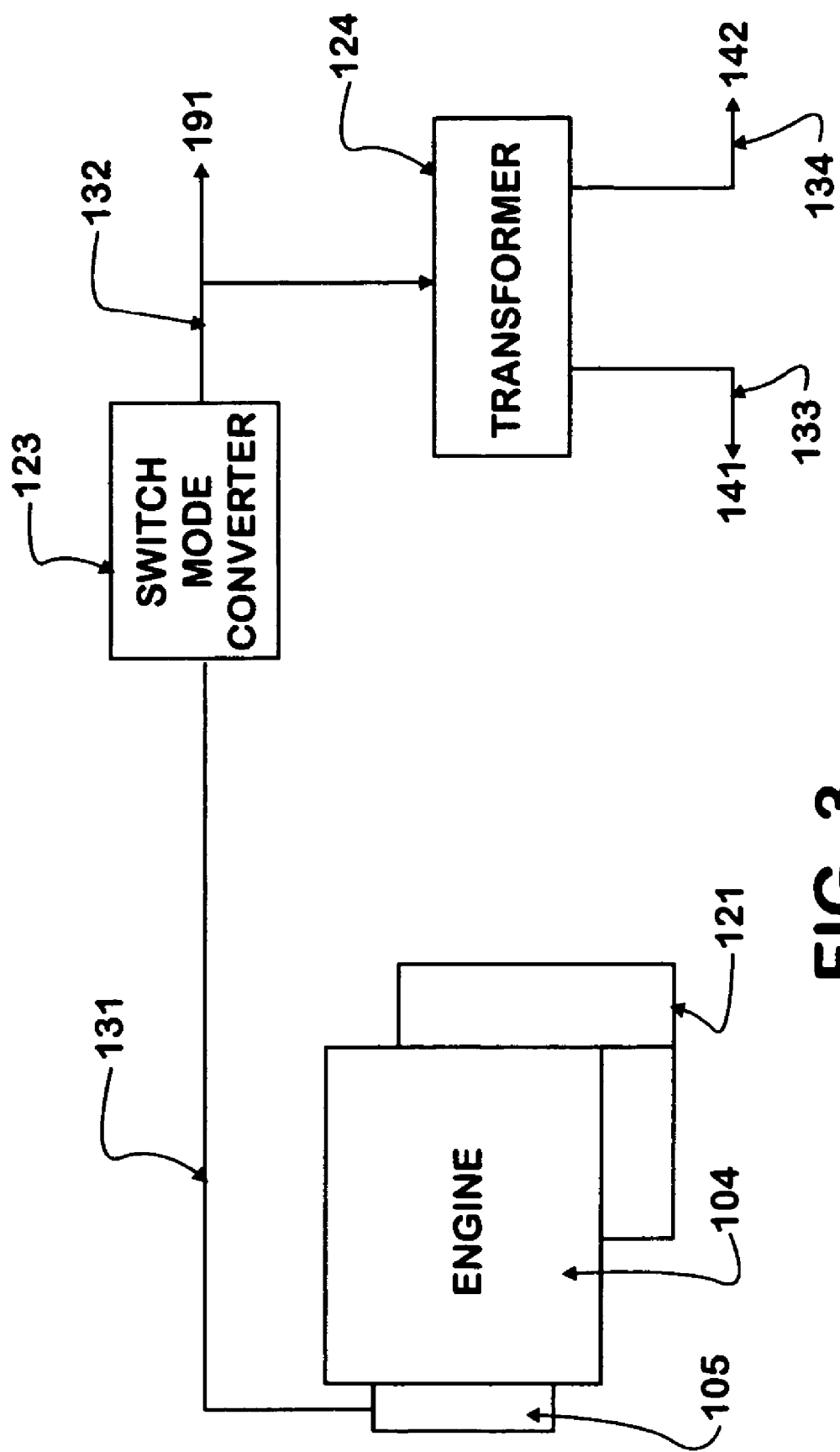
FIG. 3 is a simplified block diagram of the electrical portion of the energy management system of FIG. 1.

This invention describes a vehicle energy management system that moves towards electrification and separate subassembly cooling. The energy management system does not mandate that conventional engine capacity be increased. The energy management system relies on the principle of reallocation of existing resources provided by the vehicle original equipment manufacture (OEM) for efficient redistribution. An example vehicle 101 with an embodiment of the energy management system installed is shown in FIGS. 1 and 2. The vehicle 101 includes a chassis 102 and a cab 103. The chassis 102 includes two parallel frame rail members 102a and 102b. An engine 104 for providing the motive force for the vehicle 101 is engaged to the chassis 102. The driver and passenger control the engine 104 of the vehicle 101 from the cab 103. The engine 104 may have a flywheel structure with conventional 12 Volt starter 121. Much of the customer energy consumption equipment is installed to the chassis 102. A forward axle assembly and suspension 111 are shown engaged to the forward portion of the chassis 102; the rearward portion of the chassis 102 is not shown but includes at least one additional axle and suspension assembly 111.

The energy management system involves the replacement of engine belt or engine direct driven components with electrical motors. Since replacement of the main fan unit would involve a prohibitively large fan due to starting currents, the larger component that would have multiple cooling purposes is replaced with smaller single function electrical fan components. The larger multipurpose heat exchangers such as the vehicle radiator are replaced with smaller single function heat exchangers associated with the smaller electric fans. The system shown has separate heat exchangers for individual vehicle functions. There is a transmission heat exchanger 106, an engine coolant heat exchanger 107, an engine oil heat exchanger 109, an engine turbocharger heat exchanger 110, and a heating, ventilation, and air conditioning (HVAC) heat exchanger 108. These heat exchangers and fans may be mounted to the same vehicle component, the chassis 102 for the vehicle 101 shown. This allows for tighter tolerances between the fan and heat exchanger passages due to reduced vibration, thereby improving efficiency.

The transmission heat exchanger 106 and the HVAC heat exchanger 108 may be mounted away from the front of the vehicle 101 so as to be located closer to the components to be cooled. This could not be accomplished in the prior art system where there was one main heat exchanger and charge air cooler package. This was in the front of the vehicle to absorb the ram air generated by vehicle movement. The energy management system of this invention allows the splitting of the heat exchangers to more logical locations. The separate packaging of the heat exchangers will also allow creative changes in the esthetics or aerodynamics of the hood and vehicle front-end geometry.

Figure 4:
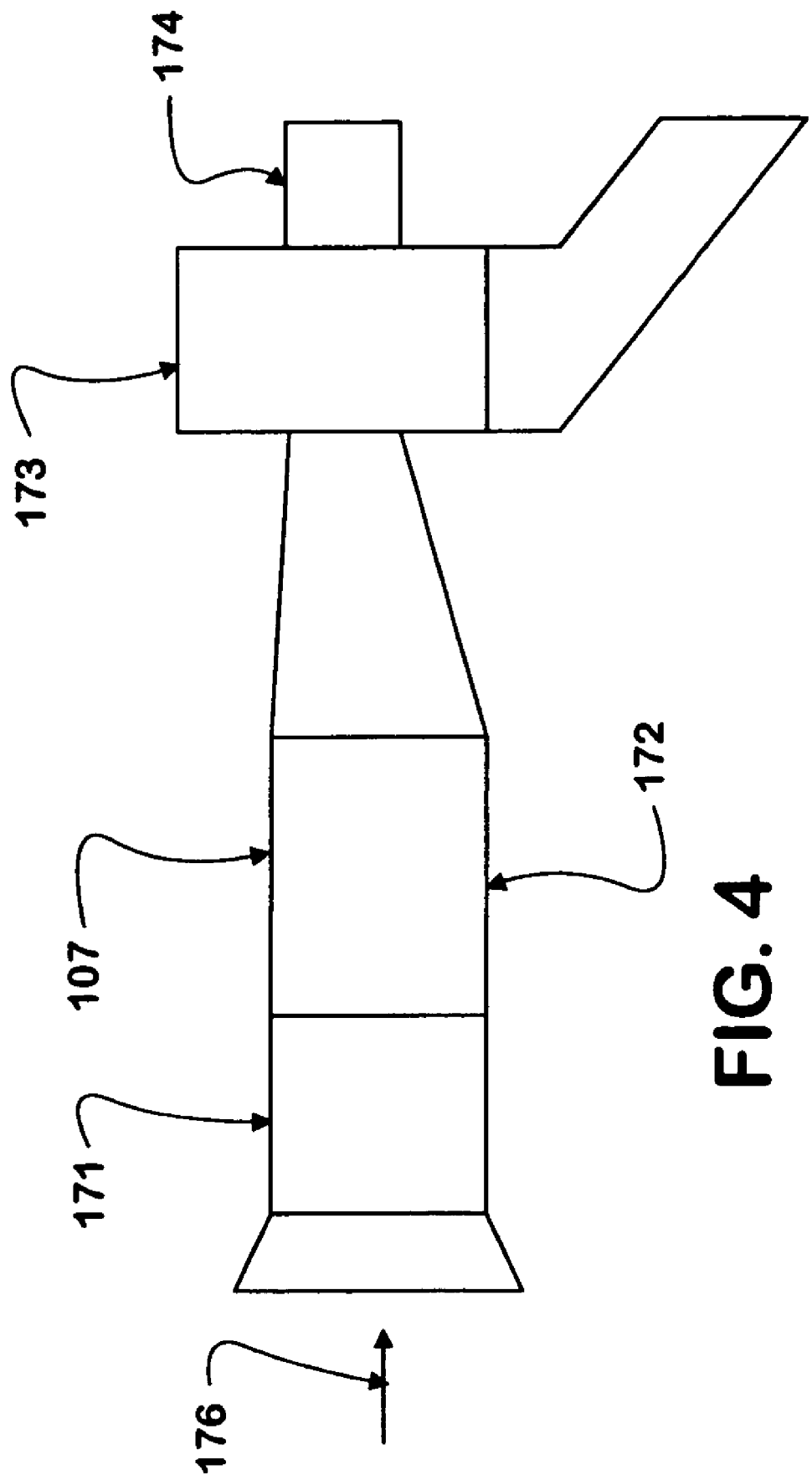
FIG. 4 is an embodiment of a heat exchanger and fan for use in the energy management system of FIG. 1.

FIG. 4 is one embodiment of the engine coolant heat exchanger 107 that may be used in the vehicle 101 energy management systems. All of the heat exchangers of vehicle 101 may be of this type. The heat exchanger 107 is characterized by having a flow stabilizing area 171 near the input air 176. The airflow stabilizes to more laminar flow within the stabilizing area before it leads into the heat exchange area 171. The outlet of the heat exchange area tapers to the downstream squirrel cage blower 173 that is driven by an electric motor 174. The blower 173 or fan portion in this case acts to pull the air inwards. The stabilized flow allows for tighter tolerances in the blower 173 that in turn allows a smaller electric fan motor 174 to be used.

The location of the transmission heat exchanger 106 and/or the HVAC heat exchanger 108 rearward of the cab 103 allows the efficiency of these heat exchangers to take advantage of the negative pressure formed behind the cab 103 during forward movement.

The energy management system may involve a main vehicle engine crankshaft mounted generator 105. This simple generator 105 creates high voltage direct current (DC) electricity. In one embodiment, this generator 105 is mounted directly to the forward portion of the crankshaft 105 of the engine 104 and also provides the crankshaft 119 dampening function to the engine 104. A separate vibration mount usually provides this dampening function in the prior art.

Figure 6:
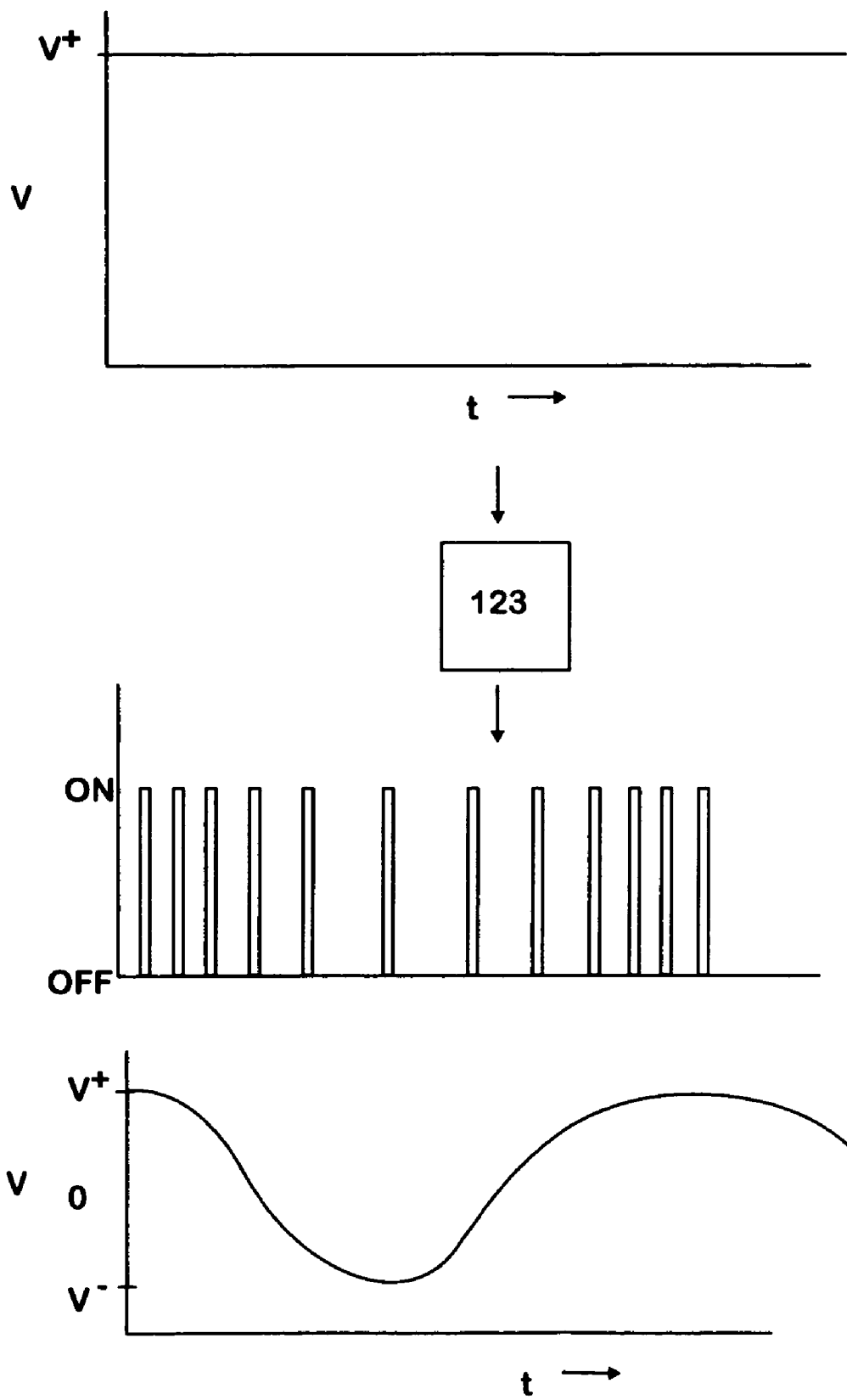
FIG. 6 shows the output of the switch mode converter of the energy converter of FIG. 3.

The high voltage DC generated by the crankshaft-mounted generator 105 may be converted to household level AC (115VAC) for the operation of customer application equipment. In one embodiment, the converter 123 is a closed loop switch mode converter 123 that makes the conversion of DC to AC alternatively turning ON and OFF at a varying frequency in order to produce a time averaged AC output. FIG. 6 pictorially shows the input and output of the switch mode converter 123 and how it approximates a time averaged AC output. The input is a high voltage DC signal. The switch mode converter 123 turns alternatively ON and OFF very quickly, actually much more frequent then shown in the drawing. The rate of turning ON and OFF is varied to provide a SIN wave output as shown. The periods of the lower rate of turning ON and OFF results in the valley in the AC SIN wave output, whereas the periods of higher rate of turning ON and OFF results in the peak in the AC SIN wave output.

The crankshaft-mounted generator 105 is electrically connected to the switch mode converter through cabling 131. The household or customer level AC output from the switch mode converter 123 is directed to the customer electrical bus 132 that is provided at the OEM level. Customer application equipment 191 is powered using this household AC. A portion of the household or customer level AC from the customer electrical bus 132 is converted to lower voltage DC through transformers or rectifiers 124. This low level DC output from the transformers or rectifiers 124 is used to power cab instruments and controls 142 through low power bus 133 and a higher level output from the transformers or rectifiers 124 through engine control power bus 134 may be used for next generation engine controls 141.

The energy management system's use of the ON-OFF closed loop, or otherwise known as a switch mode converter, 123 in a vehicle 101 is unique. Similarly, the energy management system's use of a larger number of smaller single function heat exchangers and associated electric fans provides unique advantages such as flexibility about the location of the heat exchangers in areas other than the front of the vehicle and enhanced efficiency due to tolerance reduction with the common mounting areas for fans and heat exchangers.

Figure 5:
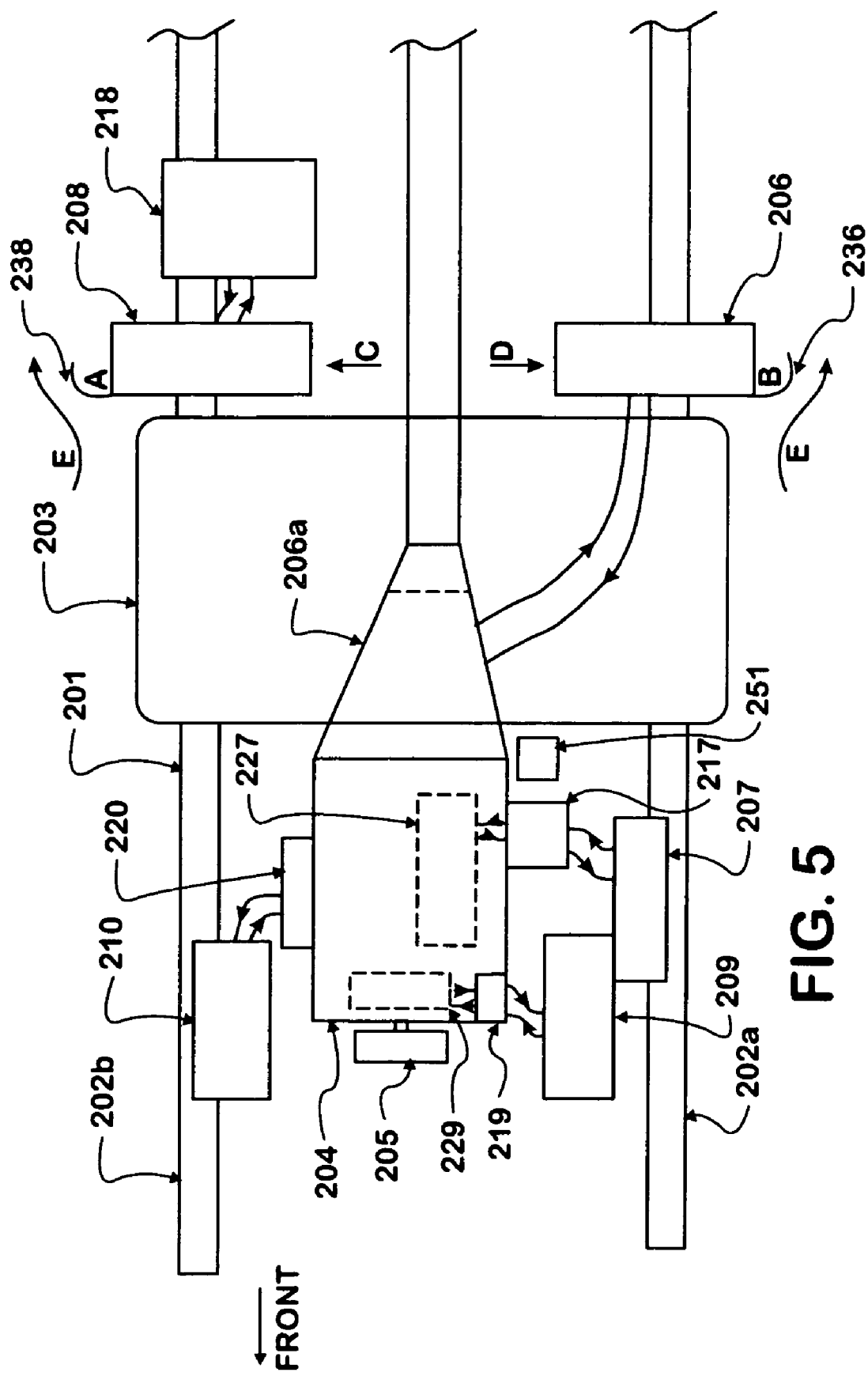
FIG. 5 is block diagram of another embodiment of the cooling system portion of the energy management system.

A second embodiment of an energy management system made in accordance with this invention is shown in FIG. 5. There is a vehicle 201 comprised of a chassis with frame rails 202a and 202b which support a passenger and vehicle cab 203 and an engine 204. The engine 204 is coupled to a transmission 206a to drive the vehicle 201. There may be a direct drive generator 205 directly engaged to the engine 204.

The transmission 206a may be cooled by a transmission heat exchanger 206 mounted to the rear of the cab 203. The rearward mounting of the transmission heat exchanger 206 results in more room in the area forward of the cab near the engine but it also results in a significant reduction in direct ram input air to the heat exchanger 206. One innovation to the transmission heat exchanger 206 or any rear-mounted heat exchanger may be the addition of an air deflector 236 at the outlet of the heat exchanger. This air deflector 236 causes a disruption or rerouting of the slipstream airflow E around the vehicle 201. The result is that a low-pressure zone B is formed at the heat exchanger outlet thereby facilitating the inlet air flow D entry into the inlet of the heat exchanger 206.

A heating ventilation and air conditioning (HVAC) heat exchanger 208 may also be located to the rear of the cab 203. This HVAC heat exchanger 208 is engaged to the HVAC compressor 218. The HVAC heat exchanger 208 may also have an air deflector 238 at the outlet of the heat exchanger 208. This air deflector 238 also causes a disruption or rerouting of the slipstream airflow E around the vehicle 201. The result is that a low-pressure zone A is formed at the heat exchanger 208 outlet thereby facilitating the inlet air flow C entry into the inlet of the heat exchanger 208.

An engine turbo-charger heat exchanger 210 with a separate electric fan may provide cooling to an engine turbo-charger 220 of the engine 204.

One aspect of this invention may include the balancing of heat loads of individual heat exchangers so as to maintain the fan motor size associated with the respective heat exchanger at power level so as not to overtax the electrical system during fan start cycles. Fan starting current peaks initially. The heat load balancing is demonstrated in FIG. 5 in the engine coolant or water heat exchanger 207 and the engine oil heat exchanger 209. The engine coolant heat exchanger 207 provides cooling to the engine 204 through the water pump 217. The engine coolant system operates under a defined capacity or volume of fluid that may be considered an engine coolant sump 227. The water pump 217 may be electrically driven in one embodiment in order to allow energy savings on pump run time. The engine oil heat exchanger 209 provides cooling to the engine 204 through the engine oil pump 219. The engine oil pump may also be electrically driven in one embodiment. The engine oil system operates under a defined capacity or volume of fluid that includes and engine oil sump 229. The load of the heat exchangers 207 and 209 may be made close to each other by increasing the fluid capacity of one sump. The more capacity a sump has the less that heat exchanger has to cool as the sump itself acts to provide heat exchanging effect. The system designers adjust the sump capacity of the oil and coolant systems such that the load on the engine oil heat exchanger 209 approximates the load on the engine coolant heat exchanger 207. This balancing allows for smaller electric motors and hence causes less of a drain on the overall electrical system.

An electric air compressor 251 may be used on the vehicle 201 for air needs in lieu of an engine direct driven air compressor that runs constantly. The electric air compressor 251 would only operate when air pressure was low hence saving on engine energy use.

The energy management system may be controlled by an electronic control module 197 to ensure that the generator and engine combination is never overloaded. This control scheme involves the cycling of the electric fans and motors such that this equipment only operates when needed and all the equipment does not operate simultaneously. For instance in one scheme of operation, on initial startup the systems might be in the following operational modes:

| Equipment | Status |
| --- | --- |
| Engine Oil HX Fan | OFF |
| Engine Coolant HX Fan | OFF |

-continued

| Equipment | Status |
| --- | --- |
| HVAC HX Fan | OFF |
| Turbo HX Fan | ON |
| Transmission HX Fan | ON or OFF (load dependent) |
| Air Compressor | ON |
| Coolant Pump | OFF |
| Oil Pump | ON |

As the engine and vehicle warm up and the vehicle is operated, heat loads increase and the electronics on the vehicle will sequence on the above equipment such as to never overload the generator and engine. During this warm up period, the generator and engine are available to provide energy to equipment that might not be needed later. For instance, the electric air compressor might be used to charge the air pressure for vehicle brake operation. Once charged, the air compressor may be de-energized until air used for brake operation. As the vehicle continues to move, the engine, transmission, and turbo charger will heat up, and the vehicle electronics may sequence on electric powered equipment to the following configuration:

| Equipment | Status |
| --- | --- |
| Engine Oil HX Fan | ON |
| Engine Coolant HX Fan | ON |
| HVAC HX Fan | OFF |
| Turbo HX Fan | ON |
| Transmission HX Fan | ON |
| Air Compressor | OFF |
| Coolant Pump | OFF |
| Oil Pump | ON |

As the vehicle picks up speed, ram air due to vehicle motion and aerodynamic formation of low pressure zones on heat exchanger outlets will reduce the need for fan operation due to the vehicle motion induced cooling air flow. As a result the vehicle electronics may cycle electric equipment as follows:

| Equipment | Status |
| --- | --- |
| Engine Oil HX Fan | OFF |
| Engine Coolant HX Fan | OFF |
| HVAC HX Fan | OFF |
| Turbo HX Fan | ON |
| Transmission HX Fan | ON |
| Air Compressor | ON or OFF (depending on brake usage) |
| Coolant Pump | ON |
| Oil Pump | ON |

The above sequencing may be designed to prevent generator and engine overloading.

Figure 7:
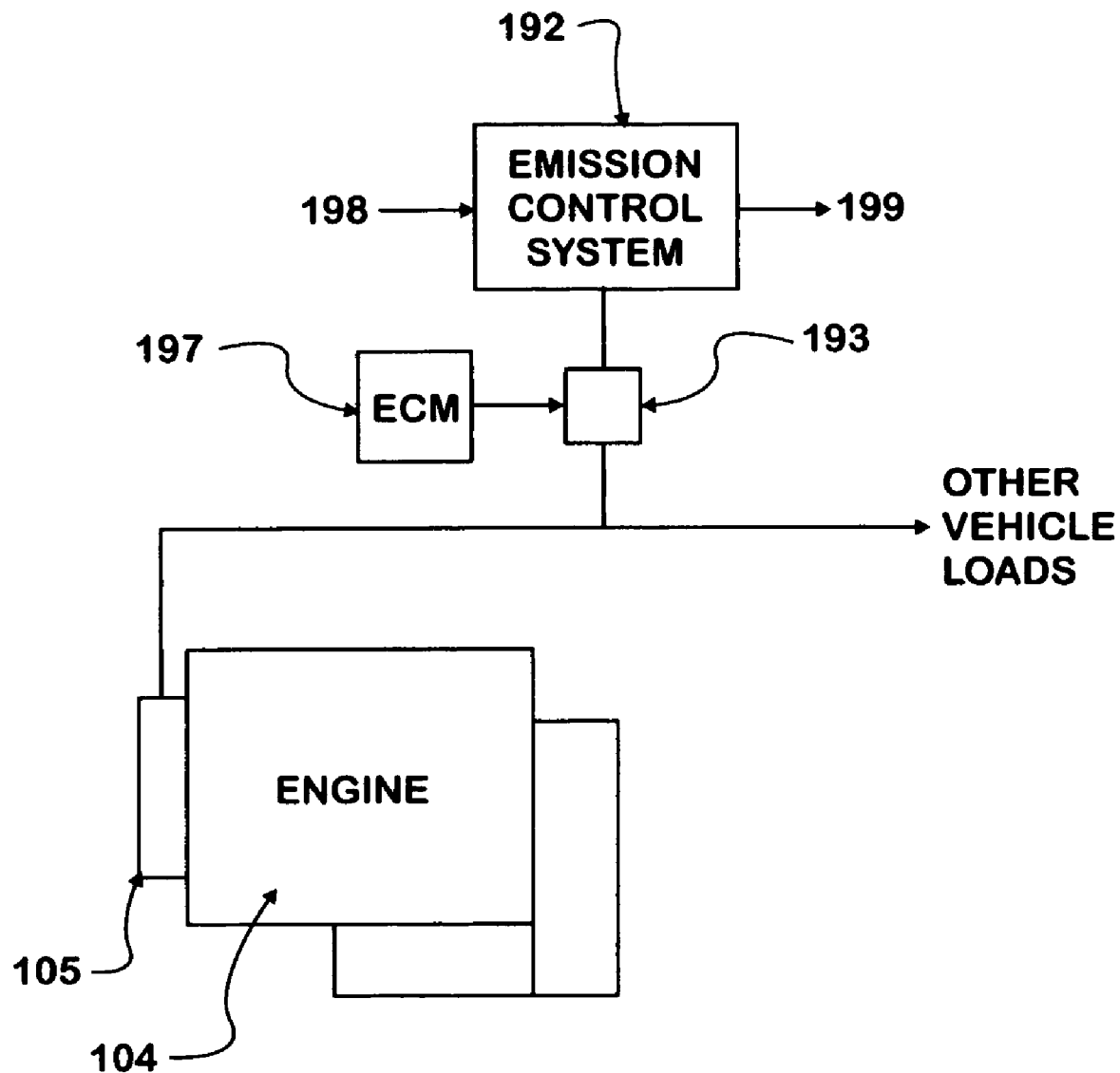
FIG. 7 shows a simplified block diagram of a second embodiment of an electrical portion of the energy management system.

Another embodiment of the energy balancing of this invention is demonstrated in FIG. 7. In this case the focus is on improving efficiency of emission control equipment for vehicles. The US Environmental Protection Agency has stepped up its enforcement of diesel engine emissions. The most recent regulations entitled 2004 rules were actually initiated in Fall 2002. The next set of even more stringent regulations is anticipated for implementation in 2006 and 2007. It is anticipated that all diesel powered vehicle exhaust systems will have some form of engine emission control exhaust after treatment system 192 in order to comply with these regulations. These systems may be a particulate trap, a NOX absorber, a NOX adsorber, or other catalytic converter. Many of these emissions control systems 192 use rare or precious metals or other catalytic substrates, such as platinum to assist in the catalytic reaction. These rare or precious metals have optimum operating temperatures that upon being heated to higher temperatures than the exhaust temperature will perform much more efficiently in emissions control than when not heated. The issue with diesel engines is that upon initial startup, especially in cold weather, the engine exhaust gases 198 are cold hence inhibiting the catalytic effect of the catalytic substrates. If these catalytic substrates within the emission control systems 192 may be heated, for example to several hundred degrees for platinum, then the emissions control systems will operate much more efficiently to provide cleaner after-treatment gases 199. The embodiment of FIG. 7 takes into account that with the shift to electric motor for the fans for the engine oil, and engine coolant heat exchangers and electric motor for the water pump, the initial electric usage on the vehicle will be less. This will provide the opportunity to apply "raw" unregulated DC output from the generator 105, which is directly driven by the engine 104 to relatively high capacity electric heaters 193 for heating the catalytic substrates within the emissions control systems 192. The advantage of an unregulated source will be that there will be no reduction of the power due to resistive losses through a regulator. The engine exhaust gases 198 will be sufficiently heated to self-warm the catalytic substrate by the time the need starts to arise for electric fans for the engine oil and engine coolant heat exchanger electric fans as well as the electric water pump to energize, hence providing an energy balance within the vehicle. The added advantage is that the use of electric heaters within the emissions control systems will allow for use of less of the precious or rare metals or exotic catalytic substrates. This will improve on overall costs to manufacture the control systems 192 as the cost of the precious or rare metals or exotic catalytic substrates is a significant contributor. Additionally, the reduction in the amount of precious or rare metals or exotic catalytic substrates should allow for smaller size emission control systems 192, allowing for improved flexibility.

Today diesel engine original equipment manufacturers (OEM) anticipate that in order for vehicles to comply with the 2007 EPA regulations, after treatment systems will include Diesel Particulate Filters (DPF) or NOX adsorbers or both. It is also anticipated that these type emission control systems 192 may require short-term heat recycling periods or long term recycling periods or both for their respective catalysts. These recycling or regeneration periods may involve heating of the catalysts to either displace or burn sulfur or transform NOX, nitrous oxide to non-harmful compounds. The periodicity on the short-term and long-term recycling periods will be variable based upon a number of factors including miles traveled, and fuel consumption. A vehicle or engine electronic control module (ECM) 197 may monitor both of these factors as well as others through the vehicle multiplexing communication system. In one embodiment, the ECM 197 can provide the control to energize or de-energize the heaters 193 upon cold startup conditions or upon the ECM's sensed need of either a short-term or long term recycle period. In the alternative, the ECM 197 may be used to provide the driver notification of the need for a recycle period in the cab 103, at which time the driver could manually initiate a recycle operation of the heaters 193. For normal or cold startup of the engine, the ECM 197 may also monitor either catalyst or exhaust temperatures to determine the need for energizing the heaters 193 and either automatically energizing or providing the driver indication of the need to manually energize the heaters 193.

As described above, the vehicle energy management system of this invention and a vehicle with this system installed provides a number of advantages, some of which have been described above and others of which are inherent in the invention. Also modifications may be proposed to the vehicle energy management system of this invention and a vehicle with this system installed without departing from the teachings herein.

I claim:

1. An energy management system in combination with a mobile vehicle, comprising:
   a chassis and a cab engaged to said chassis;
   an engine engaged to said chassis and said engine engaged to a transmission for providing motive force to said vehicle;
   a generator engaged to said engine for providing electricity to an electric system of said vehicle;
   an engine oil heat exchanger engaged to said chassis for providing cooling to oil circulated to said engine within an engine oil system;
   said engine oil heat exchanger having an electric fan powered from said electric system of said vehicle;
   a separate engine coolant system heat exchanger engaged to said chassis for providing cooling to liquid coolant circulated to said engine within an engine coolant system;
   said engine coolant system heat exchanger having an electric fan powered from said electric system of said vehicle;
   an HVAC system for providing comfort to said cab;
   a separate HVAC heat exchanger within said HVAC system to cool air for circulation to said cab;
   said HVAC heat exchanger having an electric fan powered from said electric system of said vehicle;
   a turbocharger engaged to said engine;
   a separate turbocharger heat exchanger engaged to said chassis to cool said turbocharger; and,
   said turbocharger heat exchanger having an electric fan powered from said electric system of said vehicle;
   each of said fans respectively associated with each of said heat exchangers being controlled to energize only when the heat load rises to predetermined levels said fans being controlled to sequentially energize to avoid overloading of said generator.

2. An energy management system in combination with a mobile vehicle, comprising:
   a chassis and a cab engaged to said chassis;
   an engine engaged to said chassis and said engine engaged to a transmission for providing motive force to said vehicle;
   a generator engaged to said engine for providing electricity to an electric system of said vehicle; and,
   separate heat exchangers associated with separate electric fans powered from said electric system;
   each of said fans respectively associated with each of said heat exchangers being controlled to sequentially energize to avoid overloading of said generator.

* * * * *